United States Patent [19]

Starner et al.

[11] Patent Number: 5,681,907

[45] Date of Patent: *Oct. 28, 1997

[54] FAST CURE AMINES FOR AMBIENT AND SUBAMBIENT CURE OF EPOXY RESINS COMPRISING METHYLAMINE ADDUCTS

[75] Inventors: William Edward Starner, Nesquehoning; John Anthony Marsella, Allentown; Lloyd Gerald Easterday, Bethlehem, all of Pa.

[73] Assignee: Air Products and Chemicals, Inc., Allentown, Pa.

[*] Notice: The term of this patent shall not extend beyond the expiration date of Pat. No. 5,591,812.

[21] Appl. No.: 582,782

[22] Filed: Jan. 4, 1996

[51] Int. Cl.$^6$ .................. C08G 59/50; C08G 59/52
[52] U.S. Cl. .................. 525/526; 528/111; 528/121; 528/122; 528/123; 528/124; 528/407; 564/325
[58] Field of Search .................. 564/325; 528/111, 528/407, 121, 122, 123, 124; 525/526

[56] References Cited

U.S. PATENT DOCUMENTS

| | | | |
|---|---|---|---|
| 2,643,239 | 6/1953 | Shokal et al. | 260/42 |
| 2,723,241 | 11/1955 | De Groote et al. | 252/344 |
| 3,538,184 | 11/1970 | Heer | 260/830 |
| 3,625,918 | 12/1971 | Heer et al. | 260/47 |
| 3,629,181 | 12/1971 | Heer et al. | 260/31.8 E |
| 3,655,624 | 4/1972 | Saran et al. | 260/77.5 NC |
| 3,704,281 | 11/1972 | Saran et al. | 260/77.5 NC |
| 3,758,421 | 9/1973 | Nikles, Jr. et al. | 260/2 N |
| 3,996,186 | 12/1976 | Schreiber et al. | 260/37 EP |
| 4,182,831 | 1/1980 | Hicks | 528/103 |
| 4,182,833 | 1/1980 | Hicks | 528/120 |
| 4,348,505 | 9/1982 | Di Benedetto | 525/504 |
| 4,525,542 | 6/1985 | DeGooyer | 525/484 |
| 4,539,347 | 9/1985 | DeGooyer | 523/404 |
| 4,751,278 | 6/1988 | Brytus | 528/88 |
| 5,091,474 | 2/1992 | Murakami et al. | 525/109 |
| 5,274,054 | 12/1993 | Moser | 525/526 |
| 5,310,770 | 5/1994 | DeGooyer et al. | 523/414 |

FOREIGN PATENT DOCUMENTS

| | | |
|---|---|---|
| 01080422 | 11/1985 | Japan . |
| 60-231723 | 11/1985 | Japan . |
| 60-231734 | 11/1985 | Japan . |
| 61-143419 | 7/1986 | Japan . |
| 62-153317 | 7/1987 | Japan . |
| 63-148663 | 6/1988 | Japan . |
| 01080423 | 3/1989 | Japan . |
| 6480423 | 3/1989 | Japan . |

*Primary Examiner*—Frederick Krass
*Attorney, Agent, or Firm*—Michael Leach; William F. Marsh

[57] ABSTRACT

A curable epoxy resin composition comprising a polyepoxide resin and an amine curative characterized in that the amine curative comprises the reaction product of excess monomethylamine (MMA) and a polyglycidyl ether. When a diglycidyl ether is used in the reaction the resulting product can be described by the following structure:

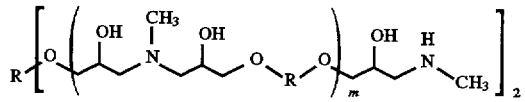

where R is an aliphatic, cycloaliphatic or aromatic organic radical and m is 0–3.

20 Claims, No Drawings

FAST CURE AMINES FOR AMBIENT AND SUBAMBIENT CURE OF EPOXY RESINS COMPRISING METHYLAMINE ADDUCTS

TECHNICAL FIELD OF THE INVENTION

The present invention relates to amine adducts useful as curing agents for epoxy resin systems.

BACKGROUND OF THE INVENTION

Epoxy resin systems that cure at ambient or low temperatures are highly desired by the coatings and adhesives industries. Such systems allow application and repair to occur under a wider range of conditions and extend the working season for many construction and repair operations.

The epoxy industry is in need of highly reactive amine curatives to enhance the rate of cure for the ambient and subambient curing of epoxy formulations for civil engineering, coating and paint applications. Polyacrylates are often incorporated into the epoxy formulation to enhance the rate of cure for ambient and subambient applications. Often mercaptans are used for very rapid cures in these formulations.

The use of alcohols and acids to accelerate the cure times of ambient and subambient cured epoxy formulations is well documented in the prior art. A good reference on this subject is Lee and Neville, "Handbook of Epoxy Resins," McGraw Hill (1967). Alcohols such as phenol, nonyl phenol, benzyl alcohol and furfurol are currently used by the epoxy industry to accelerate the curing process with commonly used amines and amine adducts. Although alcohols do accelerate the epoxy/amine reaction they can exude from the polymer detrimentally affecting the environment. As the alcohol migrates from the cured epoxy polymer the physical properties of that polymer change making them ineffective for the desired use. They also act as plasticizers to the epoxy matrix reducing the chemical resistance of the resulting cured epoxy polymer.

Other currently used accelerators include tertiary amines such as tri(dimethylamino)phenol and acids such as salicylic acid, toluenesulfonic acid and boron trifluoride. These accelerators, however, only moderately increase the cure rate of ambient and subambient cured epoxy formulations. They are fugitive, can effect the environment but do not plasticize the resulting cured epoxy formulation.

These approaches suffer from a variety of defects in that they utilize reagents that are either highly toxic, corrosive, or not wholly compatible with the rest of the epoxy formulation, thus affecting the final physical properties. A particular problem exists with the use of phenol as an accelerator, since it is highly corrosive to skin and is coming under increasing regulatory pressure.

In summary, alcohols and acids are limited in their effect on cure rate or on the physical or chemical properties of the resulting cured epoxy formulation.

Adducts from amines and mono- and diepoxides have long been used in the epoxy industry as curing agents and variants have been reported wherein excess amine is stripped from the product. The advantages of the formation of such adducts include lower volatility, reduced tendency to blush and exude, and less irritation potential. These adducts are also discussed at length in Lee and Neville, "Handbook of Epoxy Resins," McGraw Hill (1967).

JP01080423 and JP01080422 describe the preparation of a gas separation membrane by reacting equimolar amounts of an aliphatic or alicyclic diepoxide with a primary monoamine having two active hydrogens as a hardener. The resulting polymer exhibits selectivity for oxygen separation from air.

JP63148663 describes an epoxy resin composition comprised of a novolak phenol resin, a novolak epoxy resin and a primary monoamine compound used to seal a semiconductor device. The three reactants are blended in the proper equivalent amounts to generate a polymer upon heating.

JP60231723; JP62153317; JP61143419 and JP60231734 describe an additive, hydroxyalkyl amine, and the use of that additive in epoxy resin compositions. The additives are expressed by the following formula:

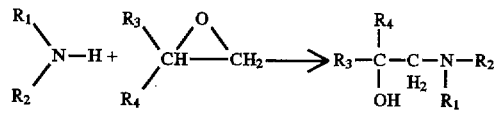

(where R1, R2, R3, and R4 are each a hydrogen, a C1 to C17 saturated or unsaturated aliphatic, alicyclic, aromatic or heterocyclic group, or a heterocyclic residue from which the nitrogen to which R1, R2, R3, and R4 are bonded has been removed; each of these groups may substituted with a halogen group, a nitro group, an alkoxy group, an allyloxy group, or an acetyl group; and R1, R2, R3, and R4 may be the same or different). The stoichiometry between epoxy groups and NH groups used to prepare the hydroxy alkyl amine of this invention may be between 1/10 and 10/1, but it is preferable to use a range of 1/1.5 to 1.5/1. The patent teaches the use of these materials to increase the rigidity of an epoxy resin without markedly sacrificing the elongation. Both primary and secondary amines are employed in the teachings of this patent.

SUMMARY OF THE INVENTION

The present invention provides N-methylamine adducts of polyglycidyl ethers as ambient and subambient temperature curing agents, or hardeners, in epoxy systems and also provides curable epoxy compositions comprising a blend of such adduct and a polyepoxide resin. Curing is effected by the use of standard procedures in the art.

The N-methylamine adducts of polyglycidyl ethers according to the invention comprise the reaction product of a polyglycidyl ether, preferably a diglycidyl ether, and excess monomethylamine (MMA) as described by the following reaction:

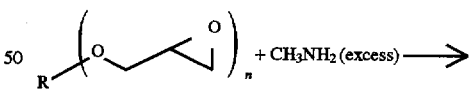

N-methylamine adducts wherein R is an aliphatic, cycloaliphatic or aromatic organic radical and n is 2–4, preferably 2. The adducts are prepared by the reaction of a polyglycidyl ether with an excess of MMA in order to minimize the formation of oligomers and tertiary amines that would otherwise result from the reaction of an MMA adduct with another molecule of polyglycidyl ether. Accordingly, the maximum amount of tertiary amine in useful reaction products is about 25 equivalent % (25 eq %), i.e., the tertiary amine content in the adduct composition should not be greater than 25 eq % of the total amine content.

Thus the invention advantageously provides a novel fast cure MMA adduct of a polyglycidyl ether for ambient and subambient curing of epoxy resin formulations. The adducts contain methylated secondary amines which are highly reactive in epoxy formulations and alcohol functionalities which are accelerators for the reaction of amine curatives with epoxy resins.

DETAILED DESCRIPTION OF THE INVENTION

According to the invention, the N-methylamine adducts of polyglycidyl ethers are prepared by the reaction of a polyglycidyl ether, preferably a diglycidyl ether, with an excess of MMA as described by the following reaction:

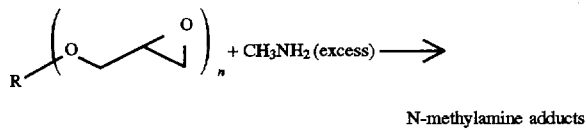

N-methylamine adducts in which R is an aliphatic, cycloaliphatic or aromatic organic radical and n is 2–4. It is desirable that R be a $C_2$–$C_6$ aliphatic, $C_5$–$C_6$ cycloaliphatic or aromatic radical such as, for example, radicals of ethylene glycol, 1,4-butanediol, 1,6-hexanediol, neopentyl glycol, cyclohexane dimethanol, bisphenol A, bisphenol F and trimethylolpropane.

When a diglycidyl ether is reacted with excess MMA, the resulting N-methylamine adducts would be represented by the following structure:

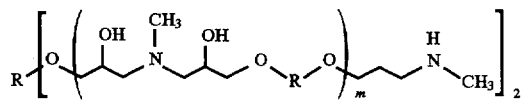

where R is as defined above and m is 0–3, preferably 0–1, and most desirably about 0. The value of m can be determined by measuring the equivalents of tertiary amine present in the composition.

An excess of MMA is employed to minimize the formation of oligomers resulting from the reaction of the MMA adduct with another molecule of polyglycidyl ether. The formation of oligomers introduces tertiary amine into the reaction product (as shown above and below) reducing the effectiveness of the reaction product as a curative for epoxies. A second purpose of this invention is to provide a process which minimizes the formation of oligomers and tertiary amine content. Of the total amine content, the maximum amount of tertiary amine in the adduct curing agent should be ~25%, preferably ~10% maximum.

To minimize the formation of oligomers, the amount of MMA used in the reaction should be >2 moles of MMA for every equivalent of epoxide; for example, since a diglycidyl ether contains 2 equivalents of epoxide per molecule, then >4 moles of MMA should be employed for every mole of diglycidyl ether. Although any excess of MMA may be used, >2 to 20 moles of MMA should be used for every equivalent of epoxide in the polyglycidyl ether, preferably 2.5 to 8 moles MMA/epoxide equivalent. The most preferred ratio of moles of MMA to equivalents of epoxide is ~5:1.

Unreacted MMA should be removed from the reaction product, preferably to less than 1 wt %, especially <0.1 wt %. The unreacted MMA may be removed by vacuum distillation.

Any polyglycidyl ether may used in the synthesis of the MMA adduct. These materials include but are not limited to the diglydicyl ethers of ethylene glycol, 1,4-butanediol, 1,6-hexanediol, neopentyl glycol and cyclohexane dimethanol; the triglycidyl ether of trimethylolpropane; and the diglycidyl ethers of bisphenol A and F.

The order of addition of the reactants for making the adducts is dependent on the temperature at which the reaction is conducted. If the reaction temperature is adequately low, for example less that 35° C., the order of addition is not critical because of the slower reaction rate of MMA with the polyglycidyl ether. At 35° C. approximately 4 hours of mixing are necessary to react all the available epoxide groups. If the reaction is carried out above about 35° C., the MMA must be charged to the reactor first. Once the MMA is in the reaction vessel the polyglycidyl ether is charged slowly to control the heat generation of the reaction. If the addition rate is too fast, the reaction temperature will rise. This temperature rise is not detrimental to the product but may be a reaction control problem from an engineering standpoint. At elevated temperatures, the addition of MMA to the polyglycidyl ether should be avoided because this will lead to the formation of oligomeric and polymeric materials increasing the tertiary amine content in the final product.

The completion point of the reaction is determined by the absence of epoxide bands in the IR at 914, 840 and 755 $cm^{-1}$. When these IR bands are gone all the epoxide groups have been consumed by the MMA. If the reaction is stopped while epoxide groups are still present and the excess, unreacted MMA removed, oligomers will be formed from the reaction of the unreacted epoxide groups with the monomethylaminated reaction product increasing the tertiary amine content in the final product.

The reaction is normally conducted without the use of a solvent. However, any solvent may be used in which both reactants and the product are soluble. Suitable solvents include alcohols such as methanol or ethanol and ethers such as diethyl ether or tetrahydrofuran. Solvents such as water,

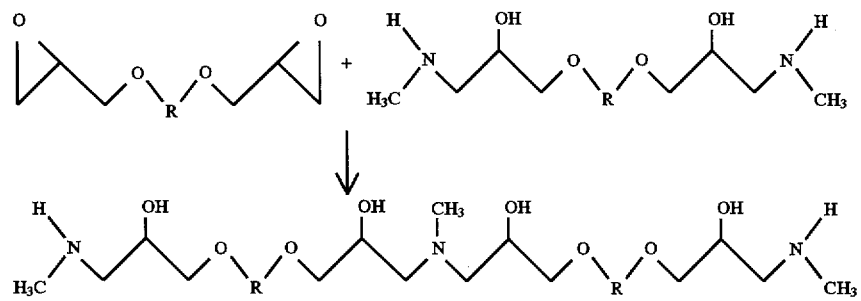

in which the diglycidyl ether is not soluble, are not suitable for the reaction because their use will lead to the production of oligomeric products. The preferred method is not to use a solvent for the reaction in order to minimize the number of process steps. However, the use of an alcohol such as methanol for the reaction solvent has been found to catalyze the reaction of MMA with the epoxide reducing the reaction time.

The reaction may be conducted at any temperature practical for the equipment being used. As MMA is a gas at room temperature, the equipment used must be able to withstand the pressure exerted by MMA at the chosen reaction conditions, i.e., the autogenous pressure. Thus the reaction should be conducted in a vessel capable of handling the pressure exerted by MMA at the desired reaction temperature. The typical temperature range for this reaction is from 0° C. to 100° C. and the preferred temperature range is from 50° C. to 70° C. Lower temperatures result in longer reaction times and higher temperatures require higher pressure equipment to contain the pressure exerted by MMA vapor.

MMA adducts of polyglycidyl ethers prepared in this fashion exhibit very short gel times (<20 minutes) when used as a curative in an epoxy formulation. Higher alkylamine adducts, such as the monoethylamine (MEA) adduct, of a polyglycidyl ether do not exhibit such short gel times due to the steric hindrance effect of the higher alkyl group bonded to the nitrogen atom. The gel time of the MEA adduct of a polyglycidyl ether formulated with an equivalent amount of epoxy resin is about 80 min.

When using the MMA adduct as an amine curative, the amount of MMA adduct employed should be within the range of about 0.8 to 1.2 equivalents of MMA adduct, preferably 0.95 to 1.05 equivalents, per equivalent of epoxy groups present in the epoxy resin. It is most preferred that the stoichiometry be about 1:1. The adduct curing agents may be used individually, or in combination, as the reaction mixtures or in combination with other curing agents and hardeners well known in the art. Thus any amine curative typically used for curing epoxy resins may be used as a co-curative with the MMA adducts. Such amine curatives include polyalkyleneamines, amidoamines, polyamides, amine adducts and alicyclic diamines such as isophorone diamine, m-xylylene diamine, and methylene biscyclohexaneamine.

The curing agents, or hardeners, of this invention are useful in applications requiring a relatively thin film of cured epoxy resin, such as coatings and adhesives. They are used to cure resins or mixtures of resins containing epoxy groups. The epoxy resins or epoxy resin mixture may be liquid or solid in nature and have an epoxide equivalent weight (EEW) based on solids of from about 150 to about 1,000, preferably from about 156 to about 700. Usually the resin mixture will consist of di- or polyepoxide resins, such as those resins listed below. The epoxy resin mixture may be modified with a portion of monofunctional epoxides.

The polyepoxy resin component of the curable epoxy composition can be any polyepoxide containing about 2 or more epoxy groups per molecule. Such epoxides are described in Y. Tanaka, "Synthesis and Characteristics of Epoxides," in C. A. May, ed., *Epoxy Resins Chemistry and Technology* (Marcel Dekker, 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like. Glycidyl ethers of polyvalent alcohols include glycidyl ethers of neopentyl, ethylene, propylene, and butylene glycol, trimethylolpropane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodcecanediol, 1,2-cyclohexanediol, 1,4-cyclohexanediol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxides, polyvinyl alcohol, polyallyl alcohol, and the like. The glycidyl derivatives include triglycidyl isocyanurate.

The glycidyl derivatives of hydantoin and hydantoin derivatives include structures shown below where R1 and R2 are alkyl chains of 1 to 4 carbons, or R1 and R2 represent a single tetramethylene or pentamethylene chain.

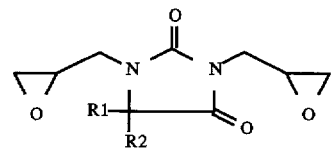

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

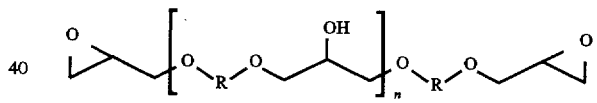

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a Whole number. Useful in this invention are polymers with a value of n between 0 and about 7. Also useful in this invention are the epoxy novolac resins, which are the glycidyl ethers of novolac resins. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about $C_4$. The novolacs typically are complex mixtures with different degrees of hydroxyl functionality. For the purposes of this invention useful functionalities range from about 2 to about 4.

The preferred polyepoxy compounds are the diglycidyl ethers of bisphenol-A and bisphenol-F, advanced bisphenol-A resins where n is between about 0.1 and about 3, and epoxy novolacs derived from phenol and formaldehyde with an average functionality of about 2 to about 4. Most preferred are diglycidyl ethers of bisphenol-A and diglycidyl ethers of bisphenol-F.

Normally, coatings according to this invention will consist of at least two components, one of which contains the epoxy resin, and the other the curing agent. It will usually be advantageous to include one or more organic solvents in one or both components of the coating. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol.

It will frequently be advantageous to include plasticizers such as benzyl alcohol, phenol, tert-butylphenol, nonylphenol, octylphenol, and the like in one or both of the components. Plasticizers reduce the glass transition temperature of the composition and therefore allow the amine and epoxide to achieve a higher degree of reaction than might otherwise be possible. Accelerators for the epoxy/amine reaction may be employed in the formulation. Useful accelerators are well known to those skilled in the art and include acids such as salicylic acid, various phenols, various carboxylic acids, and various sulfonic acids, and tertiary amines such as tris(dimethylaminomethyl)phenol.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

Thus, the MMA adduct curatives, according to the present invention, provide for epoxy resin systems that cure at ambient or low temperatures, i.e., 30° C. or below, especially 0° to 30° C., which are highly desired by the coatings and adhesive industries. Such systems allow application and repair to occur under a wider range of conditions and extend the working season for many construction and repair operations.

In the following examples the tertiary amine content was determined by treating the curing agents with an excess of acetic acid anhydride in anhydrous acetic acid to convert the secondary amine to an amide. The unreacted tertiary amine was then determined by titration with perchloric acid in anhydrous acetic acid. The secondary amine was then obtained by subtracting the tertiary amine value as determined from the total amine value obtained by titration without acetic anhydride reaction.

EXAMPLE 1

A 2.0 liter autoclave was charged with 610 g of MMA (19.7 moles). The temperature was maintained at room temperature. With agitation, 520 g of Epodil® 749 epoxide (neopentyl glycol diglycidyl ether; 1.88 moles) was added slowly over a 30 minute period. No temperature increase was observed during the addition. After addition was complete the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation. 624.1 g of the MMA adduct of the diglycidyl ether of neopentyl glycol was obtained (98% of theory). The product had a total amine value of 293.7 mg KOH/g, an N—H equivalent weight of 196 and a viscosity of 39.4 Pa-s. This product will be identified as 749MMA in following examples.

EXAMPLE 2

A 2.0 liter autoclave was charged with 8.10 g of MMA (19.7 moles). The temperature was maintained at room temperature. With agitation, 520 g of Epodil 750 epoxide (1,4-butanediol diglycidyl ether; 2.0 moles) was added slowly over a 30 minute period. No temperature increase was observed during the addition. After addition was complete the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation. 808.3 g of the MMA adduct of the diglycidyl ether of 1,4-butanediol was obtained (97.5% of theory). The product had a total amine value of 322.4 mg KOH/g, an N—H equivalent weight of 182 and a viscosity of 10.8 Pa-s. This product will be identified as 750MMA in the following examples.

EXAMPLE 3

A 2.0 liter autoclave was charged with 810 g of MMA (19.7 moles). The temperature was maintained at room temperature. With agitation, 520 g of Epodil 757 epoxide (cyclohexane dimethanol diglycidyl ether; 1.825 moles) was added slowly over a 30 minute period. No temperature increase was observed during the addition. After addition was complete, the reaction mixture was agitated for 30 minutes. The reaction was complete when the IR bands for the epoxy group at 9.14, 840 and 755 cm$^{-1}$ were no longer present. The unreacted MMA was then removed from the reaction mixture by venting to a collection vessel. Residual MMA was removed from the product by reduced pressure distillation. 808.3 g of the MMA adduct of the diglycidyl ether of cyclohexane dimethanol was obtained (98% of theory). The product had an total amine value of 262.1 mg KOH/g, an N—H equivalent weight of 225 and a viscosity of 88.4 Pa-s. This product will be identified as 757MMA in the following examples.

EXAMPLE 4

A 0.15 liter autoclave was charged with 31.5 g of MMA (1.0 moles). The temperature was maintained at 50° C. With agitation, 28.7 g of trimethylolpropane triglycidyl ether (0.068 moles; 0.2 eq) was added slowly at 0.5 g/min. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation. 33.1 g of the MMA adduct of the triglycidyl ether of trimethylolpropane was obtained (95% of theory). The product had a total amine value of 289.0 mg KOH/g and an N—H equivalent weight of 266.5. This product will be identified as TMPTGEMMA-1 in following examples.

EXAMPLE 5

A 0.15 liter autoclave was charged with 23.2 g of MMA (0.75 moles). The temperature was maintained at 50° C. With agitation, 41.8 g of a 50% solution trimethylolpropane triglycidyl ether (0.05 moles; 0.15 eq) in methanol was added slowly at 0.7 g/min. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA and methanol were removed from the product by reduced pressure distillation. 24.3 g of the MMA adduct of the triglycidyl ether of trimethylolpropane was obtained (95% of theory). The product had a total amine value of 291.3 mg KOH/g, an N—H equivalent weight of 254.2. This product will be identified as TMPTGEMMA-2 in following examples.

EXAMPLE 6

A 0.15 liter autoclave was charged with 27.6 g of MMA (0.90 moles) and 18.7 g of methanol. The temperature was maintained at 50° C. With agitation, 18.8 g of Epon® 828 epoxide (diglycidyl ether of bisphenol A; 0.10 moles) was added slowly at 0.4 g/min. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA and methanol were removed from the product by reduced pressure distillation. 20.8 g of the MMA adduct of the diglycidyl ether of bisphenol A was obtained (95% of theory). The product had a total amine value of 226.8 mg KOH/g and an N—H equivalent weight of 259.4.

EXAMPLE 7

A 2.0 liter autoclave was charged with 443.2 g of monoethylamine (9.85 moles). The temperature was maintained at room temperature. With agitation, 260 g of Epodil 749 epoxide (neopentyl glycol diglycidyl ether; 0.94 moles) was added slowly over a 30 minute period. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted monoethylamine (MEA) was then removed from the reaction mixture by venting to a collection vessel. Residual MEA was removed from the product by reduced pressure distillation. 298.9 g of the MEA adduct of the diglycidyl ether of neopentyl glycol was obtained (98% of theory). The product had a total amine value of mg KOH/g, an N—H equivalent weight of 216 and a viscosity of 1000 Pa-s. This product will be identified as 749MEA in following examples.

EXAMPLES 8–14

These examples show the gel time comparison of MMA and MEA adducts with aminoethylpiperazine (AEP). A plastic container was charged with Epon 828 epoxy resin (188 eq. wt.) and an equivalent amount of curative prepared in Examples 1, 2, 3, 4, 5 and 7. The room temperature gel time was measured according to ASTM D2471-71. The charges and gel times are shown in Table 1.

TABLE 1

| Example | Curative (type) | Curative (g) | Epon 828 (g) | Gel Time (minutes) |
|---|---|---|---|---|
| 8 | 749MMA | 25.4 | 25.0 | 11.5 |
| 9 | 750MMA | 23.5 | 25.0 | 10.2 |
| 10 | 757MMA | 28.5 | 25.0 | 10.2 |
| 11 | TMPTGEMMA-1 | 30.0 | 21.2 | 13.0 |
| 12 | TMPTGEMMA-2 | 22.5 | 16.6 | 12.8 |
| 13 | 749MEA | 27.5 | 25.0 | 82.5 |
| 14 | AEP | 9.2 | 25.0 | 18.0 |

Examples 8, 9, 10, 11, 12 and 13 show the room temperature gel times of Epon epoxy resin, diglycidyl ether of bisphenol A, with 749MMA, 750MMA, 757MMA, TMPTGEMMA-1, TMPTGEMMA-2 and 749MEA prepared in Examples 1, 2, 3, 4, 5 and 7, respectively, following the ASTM procedure D2471-71 using approximately a 50 g total mass sample. AEP, one of the faster amine curatives, was used in Example 14 for comparison. A comparison of the gel times in Examples 8, 9, 10, 11, and 12 with Example 13 show that a MMA adduct such as 749MMA, 750MMA, 757MMA or TMPTGEMMA gave very short gel times compared to a monoethylamine adduct such as 749MEA. Furthermore, comparison of the MMA adducts with Example 14 clearly shows that the MMA adducts have much shorter gel times than the faster conventional curatives such as AEP.

EXAMPLES 15–20

These examples demonstrate the effect of reaction temperature on MMA adduct formation. Table 2 shows the effect of reaction temperature using 8 moles of MMA per equivalent of Epodil 749 resin. Table 3 shows the effect of reaction temperature using 2.5 moles of MMA per equivalent of Epodil 749 resin.

The MMA was charged to a 150 ml autoclave equipped with a heater, agitator, thermocouple, and feed pump. The MMA was heated to the desired temperature with agitation. Epodil 749 resin was then metered into the autoclave over a 1 hour period. The reactant levels and conditions are described in Tables 2 and 3. Examples 15, 16 and 17 (Table 1) show the effect of reaction temperature when using a reactant ratio of 8 moles of MMA per equivalent of epoxide. Examples 18, 19 and 20 (Table 2) show the effect of reaction temperature when using 2.5 moles of MMA per equivalent of epoxide. The reactions were stopped when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation.

Comparison of Examples 15, 16 and 17 shows that at 8:1 moles of MMA to equivalent of epoxide as the reaction temperature was increased from 35° to 50° to 70° C. the amount of tertiary amine produced decreases. However, all the products from all three examples had similar N—H equivalent weights. Examples 18, 19 and 20 show the same effect with regard to the tertiary amine content, but at the lower MMA to epoxide ratio the N—H equivalent weight of the product was dramatically affected. The higher reaction temperature generated a lower N—H equivalent weight.

TABLE 2

| EXAMPLE | 15 | 16 | 17 |
|---|---|---|---|
| CHARGES | | | |
| MMA (g) | 33 | 33 | 33 |
| Epodil 749 (g) | 18 | 18 | 18 |
| REACTION TEMP. (°C.) | 35 | 50 | 70 |
| REACTION TIME AFTER ADDITION (HR) | 2 | 1 | 1 |
| TOTAL AMINE VALUE (mg KOH/g) | 309.9 | 289.5 | 293.5 |
| TERTIARY AMINE VALUE (mg KOH/g) | 28.6 | 10.6 | 8.2 |
| % TERTIARY AMINE | 9.2 | 3.7 | 2.8 |
| SECONDARY AMINE VALUE (mg KOH/g) | 281.4 | 278.9 | 285.2 |
| N—H EQUIVALENT WEIGHT | 199.4 | 201.1 | 196.7 |

TABLE 3

| EXAMPLE | 18 | 19 | 20 |
|---|---|---|---|
| CHARGES | | | |
| MMA (g) | 18 | 18 | 18 |
| Epodil 749 (g) | 32 | 32 | 32 |
| REACTION TEMP. (°C.) | 35 | 50 | 70 |
| REACTION TIME AFTER ADDITION (HR) | 2 | 1 | 1 |
| TOTAL AMINE VALUE (mg KOH/g) | 266.1 | 298.9 | 320.4 |
| TERTIARY AMINE VALUE (mg KOH/g) | 60.6 | 69.9 | 23.5 |
| % TERTIARY AMINE | 22.8 | 23.4 | 7.3 |
| SECONDARY AMINE VALUE (mg KOH/g) | 205.5 | 229.0 | 296.8 |
| N—H EQUIVALENT WEIGHT | 273.0 | 244.9 | 189.0 |

EXAMPLES 21-26

These examples show the effect of stoichiometry for 749MMA.

The reactions were conducted as described in Example 15 using the reactant levels and conditions shown in Table 4. These examples show that the molar ratio of MMA to epoxide affects the N—H equivalent weight/amine value of the final product and the amount of tertiary amine generated in the reaction. As the amount of excess MMA was reduced, the tendency to form tertiary amine (higher molecular weight oligomers) increased. If the ratio of MMA to epoxide is 2.0:1 or less as in Examples 24, 25 and 26, the N—H equivalent weight of the MMA adduct is extremely high and unsuitable for the purpose of this invention.

TABLE 4

| EXAMPLE | 21 | 22 | 23 | 24 | 25 | 26 |
|---|---|---|---|---|---|---|
| MOLES OF MMA PER EQ OF 749 CHARGE | 8.0 | 5.0 | 2.5 | 2.0 | 1.5 | 1.0 |
| MMA (g) | 33 | 60 | 18 | 19 | 16 | 10 |
| EPODIL 749 (g) | 18 | 26 | 32 | 41 | 46 | 46 |
| REACTION TEMP. (°C.) | 50 | 50 | 50 | 50 | 50 | 50 |
| REACTION TIME AFTER ADDITION (hr) | 1 | 1 | 1 | 1 | 1 | 1 |
| TOTAL AMINE VALUE (mg KOH/g) | 289.5 | 291.0 | 298.9 | 247.4 | 258.5 | 212.7 |
| TERT AMINE VALUE (mg KOH/g) | 10.6 | 39.4 | 69.9 | 77.9 | 95.7 | 96.9 |
| % TERT AMINE | 3.7 | 13.5 | 23.4 | 31.5 | 37.0 | 45.6 |
| SEC AMINE VALUE (mg KOH/g) | 278.9 | 251.5 | 229.0 | 169.5 | 162.8 | 115.8 |
| N—H EQ WT | 201.1 | 223.0 | 244.9 | 331.0 | 344.6 | 484.5 |

EXAMPLES 27-32

These examples show the effect of stoichiometry on 750MMA.

The reactions were conducted as described in Example 15 using the reactant levels and conditions shown in Table 5. These examples show that the molar ratio of MMA to epoxide affects the N—H equivalent weight/amine value of the final product and the amount of tertiary amine generated in the reaction. As the amount of excess MMA was reduced, the tendency to form tertiary amine (higher molecular weight oligomers) increased. If the ratio of moles MMA to equivalents epoxide was less than 2.0:1 as in Examples 31 and 32, the N—H equivalent weight of the MMA adduct and the % tertiary amine content were extremely high and unsuitable for the purpose of this invention.

TABLE 5

| EXAMPLE | 27 | 28 | 29 | 30 | 31 | 32 |
|---|---|---|---|---|---|---|
| MOLES OF MMA PER EQ OF 750 CHARGE | 8.0 | 5.0 | 2.5 | 2.0 | 1.5 | 1.0 |
| MMA (g) | 33 | 60 | 18 | 19 | 16 | 10 |
| EPODIL 749 (g) | 17 | 48 | 29 | 38 | 43 | 40 |
| REACTION TEMP. (°C.) | 70 | 70 | 70 | 70 | 70 | 70 |
| REACTION TIME AFTER ADDITION (hr) | 1 | 1 | 1 | 1 | 1 | 1 |
| TOTAL AMINE VALUE (mg KOH/g) | 322.4 | 317.9 | 312.4 | 306.6 | 272.5 | 240.0 |
| TERT AMINE VALUE (mg KOH/g) | 14.7 | 26.9 | 65.6 | 70.8 | 89.1 | 113.8 |
| % TERT AMINE | 4.6 | 8.5 | 21.0 | 23.1 | 32.7 | 47.7 |
| SEC AMINE VALUE (mg KOH/g) | 307.7 | 291.0 | 246.8 | 236.0 | 183.4 | 126.2 |
| N—H EQ WT | 182.3 | 192.8 | 227.3 | 237.7 | 305.9 | 444.5 |

EXAMPLES 33-38

These examples show the effect of the 750MMA adduct's equivalent weight and tertiary amine concentration on the gel time of Epon 828/750MMA formulations.

A plastic container was charged with Epon 828 epoxy resin (188 eq wt) and an equivalent amount of the 750MMA curatives prepared in Examples 27-32. The room temperature gel time was measured according to ASTM D2471-71. The charges and gel times are shown in the Table 6.

TABLE 6

| EXAMPLE | 33 | 34 | 35 | 36 | 37 | 38 |
|---|---|---|---|---|---|---|
| ADDUCT (EX.) | 27 | 28 | 29 | 30 | 31 | 32 |
| MOLES OF MMA PER | 8.0 | 5.0 | 2.5 | 2.0 | 1.5 | 1.0 |

TABLE 6-continued

| EXAMPLE | 33 | 34 | 35 | 36 | 37 | 38 |
|---|---|---|---|---|---|---|
| EQ OF 750 | | | | | | |
| N—H EQ WT | 182.3 | 192.8 | 227.3 | 237.7 | 305.9 | 444.5 |
| % TERTIARY AMINE CURATIVE MIXTURE | 4.6 | 8.5 | 21.0 | 23.1 | 32.7 | 47.4 |
| 750MMA (G) | 23.5 | 21.6 | 26.7 | 23.6 | 27.5 | 30.0 |
| EPON 828 (G) | 25 | 21.1 | 22.1 | 18.6 | 16.9 | 12.7 |
| GEL TIME (MIN) | 10.2 | 10.2 | 10.9 | 11.4 | 13.5 | 20.7 |

The presence of higher tertiary amine content substantially increased the gel time of Epon 828/monomethylated amine adduct curative blends. This is clearly shown by room temperature gel time measurements of Epon 828 and the various N—H equivalent weight MMA adducts obtained in Examples 27 to 32. Curative blends were prepared by mixing equivalent amounts Epon 828 resin and 750MMA. The gel time of the mixture was measured immediately. The gel times shown in Examples 33 to 38 clearly show that the N—H equivalent weight and the amount of tertiary amine present in the MMA adduct had a significant effect on the gel time. As the N—H equivalent weight and the concentration of tertiary amine increased in the 750MMA, the gel time of the Epon 828/750MMA mixtures increased. When the N—H equivalent weight was above 300 and the tertiary amine content was >25%, the cases where the 750MMA was prepared from <2 moles MMA per equivalent epoxide, the gel time of the Epon 828/750MMA formulation became too lengthy. To obtain 750MMA with the appropriate gel time the reaction stoichiometry used in its preparation should be a minimum of 2:1 (moles MMA:equivalents epoxide.

EXAMPLES 39–44

The examples in Table 7 show the effect of the equivalent weight of the MMA adduct on the gel time of Epon 828/749MMA/PACM formulations.

The presence of higher tertiary amine content substantially increased the gel time of the monomethylated amine adduct when used in conjunction with another amine curative such as bis(4-aminocyclohexyl)methane [PACM]. This is clearly shown by room temperature gel time measurements of blends of PACM and the various N—H equivalent weight MMA adducts obtained in Examples 39 to 44. Curative blends of PACM and the 749MMA adducts of Examples 21 to 26 were prepared by mixing 0.75 and 0.25 equivalents of each, respectively. Each blend was mixed with a stoichiometric amount of Epon 828 epoxy resin and the gel time measured. The gel times obtained clearly show that the N—H equivalent weight and tertiary amine content of the MMA adduct have a significant effect on the gel time reduction imparted by the MMA adduct. A reaction stoichiometry of >2.5:1 moles MMA to equivalents epoxide should be used if the resulting MMA adduct is to have the necessary N—H equivalent weight and adequately low tertiary amine content (<25%) to impart a rapid gel time to the epoxy/amine formulation.

TABLE 7

| EXAMPLE | 39 | 40 | 41 | 42 | 43 | 44 |
|---|---|---|---|---|---|---|
| ADDUCT (EX.) | 21 | 22 | 23 | 24 | 25 | 26 |
| MOLES OF MMA PER EQ OF 749 | 8.0 | 5.0 | 2.5 | 2.0 | 1.5 | 1.0 |

TABLE 7-continued

| EXAMPLE | 39 | 40 | 41 | 42 | 43 | 44 |
|---|---|---|---|---|---|---|
| N—H EQ WT | 201.1 | 223.0 | 224.9 | 331.0 | 344.6 | 484.5 |
| % TERTIARY AMINE CURATIVE MIXTURE | 3.7 | 13.5 | 23.4 | 31.5 | 37.0 | 45.6 |
| 749MMA (g) | 9.1 | 10.1 | 11.1 | 14.9 | 15.6 | 21.9 |
| PACM (g) | 7.2 | 7.2 | 7.2 | 7.2 | 7.2 | 7.2 |
| EPON 828 (g) | 34.0 | 34.0 | 34.0 | 34.0 | 34.0 | 34.0 |
| GEL TIME (MIN) | 22.2 | 22.6 | 27.0 | 40.3 | 47.3 | 55.3 |

The MMA adduct of a polyglycidyl ether contains two functional groups which cause the reactivity enhancement observed with these materials. These functional groups are the N-methyl secondary amine and the alcohol group bound to the adjacent carbon atom. The N-methylated secondary amines are known to be extremely reactive nucleophiles particularly when reacting with epoxides. In fact, they are more reactive than most primary amines. Alcohols are well known accelerators for the reaction of amines with epoxides. The presence of alcohol functionality on the adjacent carbon atom to the N-methyl secondary amine acts as an accelerator and also provides anchimeric assistance to the nucleophilicity of the amine. The alcohol present in the backbone of the molecule, the result of oligomer formation when insufficient MMA is used for the synthesis of the MMA adduct, does not exhibit the same rate enhancing effect. Thus, the amount of oligomer formation or tertiary amine content must be minimized to <25% in order to maximize the amount of both N-methyl secondary amine and the active alcohol functionality.

The present invention requires for the preparation of the N-methylamine adducts >2:1 of moles of MMA to equivalents of epoxide to obtain the rapid gel time effect. The MMA adduct of a polyglycidyl ethers can be used alone or in combination with another amine curing agent. If the moles MMA to epoxide equivalents ratio is ≤2:1, the resulting reaction product does not exhibit the desired short gel times. Only the MMA adduct of polyglycidyl ethers show the short gel time affect in the invention. Higher alkyl amines both primary and secondary do not exhibit the same short gel time effect when used alone or in combination with other amine curatives.

STATEMENT OF INDUSTRIAL APPLICATION

The present invention provides MMA adducts of polyglycidyl ethers for use as ambient and subambient temperature curing agents and hardeners in epoxy systems.

We claim:

1. An amine curative composition for epoxy resins consisting essentially of the reaction product of monomethylamine and a polyglycidyl ether reacted in a ratio of >2 moles of monomethylamine per equivalent of epoxide and containing a maximum of 25 eq % tertiary amine.

2. The amine curative composition of claim 1 in which >2 to 20 moles of monomethylamine per equivalent of epoxide are reacted.

3. The amine curative composition of claim 1 in which 2.5 to 8 moles of monomethylamine per equivalent of epoxide are reacted.

4. The amine curative composition of claim 1 in which about 5 moles of monomethylamine per equivalent of epoxide are reacted.

5. The amine curative composition of claim 1 in which the polyglycidyl ether is selected from the group consisting of diglydicyl ether of ethylene glycol, diglydicyl ether of 1,4-butanediol, diglydicyl ether of 1,6-hexanediol, diglydicyl ether of neopentyl glycol, diglydicyl ether of cyclohexane dimethanol, triglycidyl ether of trimethylolpropane, diglycidyl ether of bisphenol A and diglydicyl ether of bisphenol F.

6. The amine curative composition of claim 1 which contains a maximum of 10 eq % tertiary amine.

7. The amine curative composition of claim 1 in which the unreacted monomethylamine content is <1 wt %.

8. An amine curative composition for epoxy resins consisting essentially of the reaction product of monomethylamine and a polyglycidyl ether reacted in a ratio of 2.5 to 8 moles of monomethylamine per equivalent of epoxide and containing a maximum of 25 eq % tertiary amine and an unreacted monomethylamine content <1 wt %.

9. The amine curative composition of claim 8 in which the polyglycidyl ether is selected from the group consisting of diglydicyl ether of ethylene glycol, diglydicyl ether of 1,4-butanediol, diglydicyl ether of 1,6-hexanediol, diglydicyl ether of neopentyl glycol, diglydicyl ether of cyclohexane dimethanol, triglycidyl ether of trimethylolpropane, diglycidyl ether of bisphenol A and diglydicyl ether of bisphenol F.

10. The amine curative composition of claim 8 which contains a maximum of 10 eq % tertiary amine.

11. The amine curative composition of claim 8 in which the unreacted monomethylamine content is <0.1 wt %.

12. The amine curative composition of claim 8 in which the monomethylamine and a polyglycidyl ether are reacted in a ratio of 2.5 to 8 moles of monomethylamine per equivalent of epoxide and contain a maximum of 10 eq % tertiary amine and an unreacted monomethylamine content <0.1 wt %, the polyglycidyl ether being selected from the group consisting of diglydicyl ether of ethylene glycol, diglydicyl ether of 1,4-butanediol, diglydicyl ether of 1,6-hexanediol, diglydicyl ether of neopentyl glycol, diglydicyl ether of cyclohexane dimethanol, triglycidyl ether of trimethylolpropane, diglycidyl ether of bisphenol A and diglydicyl ether of bisphenol F.

13. An amine curative composition for epoxy resins consisting essentially of one or more compounds represented by the following structure:

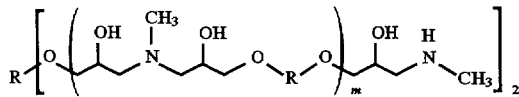

where R is an aliphatic, cycloaliphatic or aromatic organic radical and m is 0–3.

14. The amine curative composition of claim 13 in which R is a radical of ethylene glycol, 1,4-butanediol, 1,6-hexanediol, neopentyl glycol, cyclohexane dimethanol, bisphenol A or bisphenol F.

15. A curable epoxy resin composition comprising a polyepoxide resin and an amine curative characterized in that the amine curative comprises the composition of claim 1.

16. A curable epoxy resin composition comprising a polyepoxide resin and an amine curative characterized in that the amine curative comprises the composition of claim 6.

17. A curable epoxy resin composition comprising a polyepoxide resin and an amine curative characterized in that the amine curative comprises the composition of claim 8.

18. A curable epoxy resin composition comprising a polyepoxide resin and an amine curative characterized in that the amine curative comprises the composition of claim 10.

19. A curable epoxy resin composition comprising a polyepoxide resin and an amine curative characterized in that the amine curative comprises the composition of claim 11.

20. A curable epoxy resin composition comprising a polyepoxide resin and an amine curative characterized in that the amine curative comprises the composition of claim 12.

* * * * *